April 6, 1937.  W. F. BOLDT ET AL  2,076,362
POWER TRANSMISSION MECHANISM
Filed Oct. 24, 1935  3 Sheets-Sheet 1
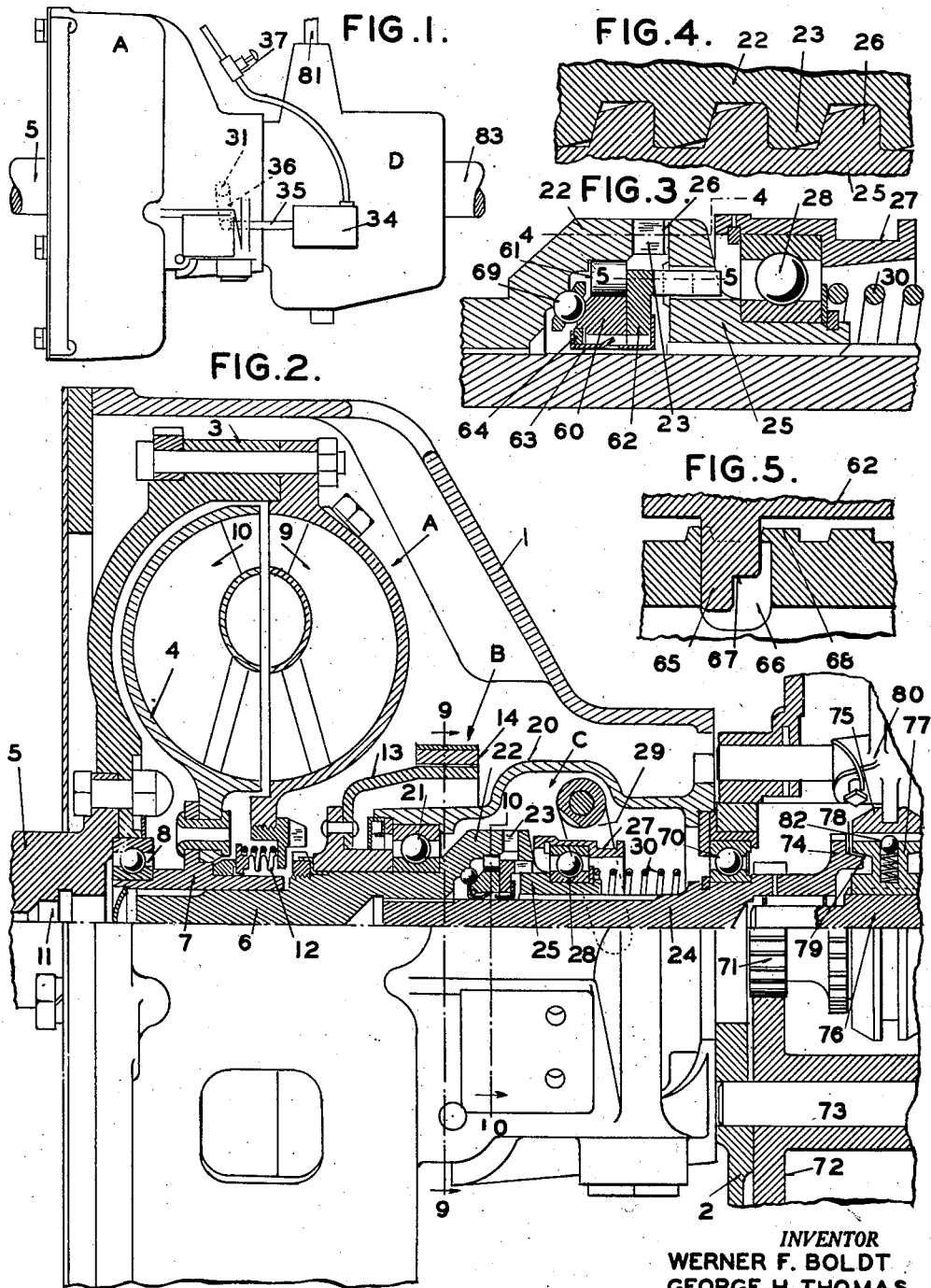
INVENTOR
WERNER F. BOLDT
GEORGE H. THOMAS
BY
E. O. Huffman
ATTORNEY.

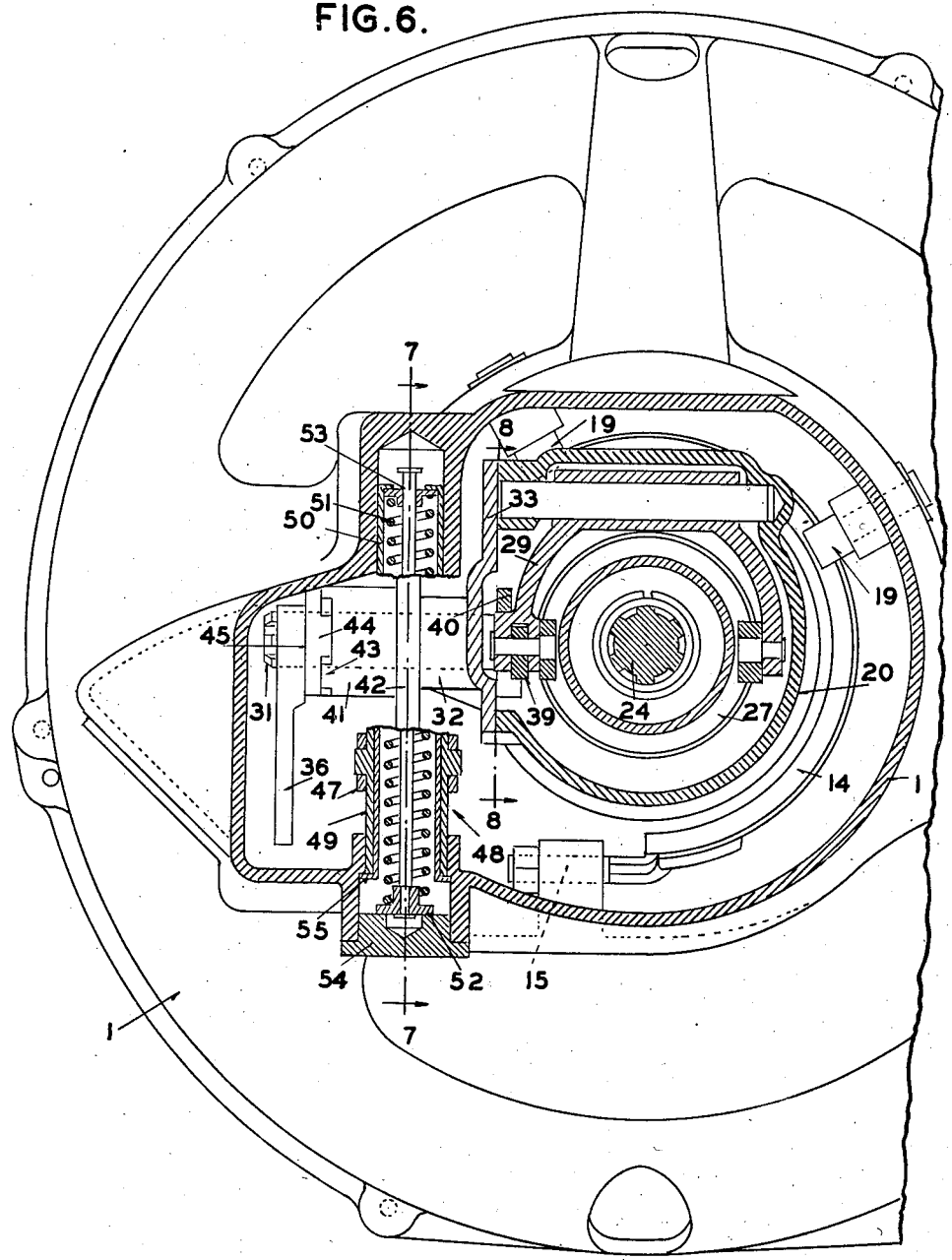

April 6, 1937. W. F. BOLDT ET AL 2,076,362
POWER TRANSMISSION MECHANISM
Filed Oct. 24, 1935   3 Sheets-Sheet 3
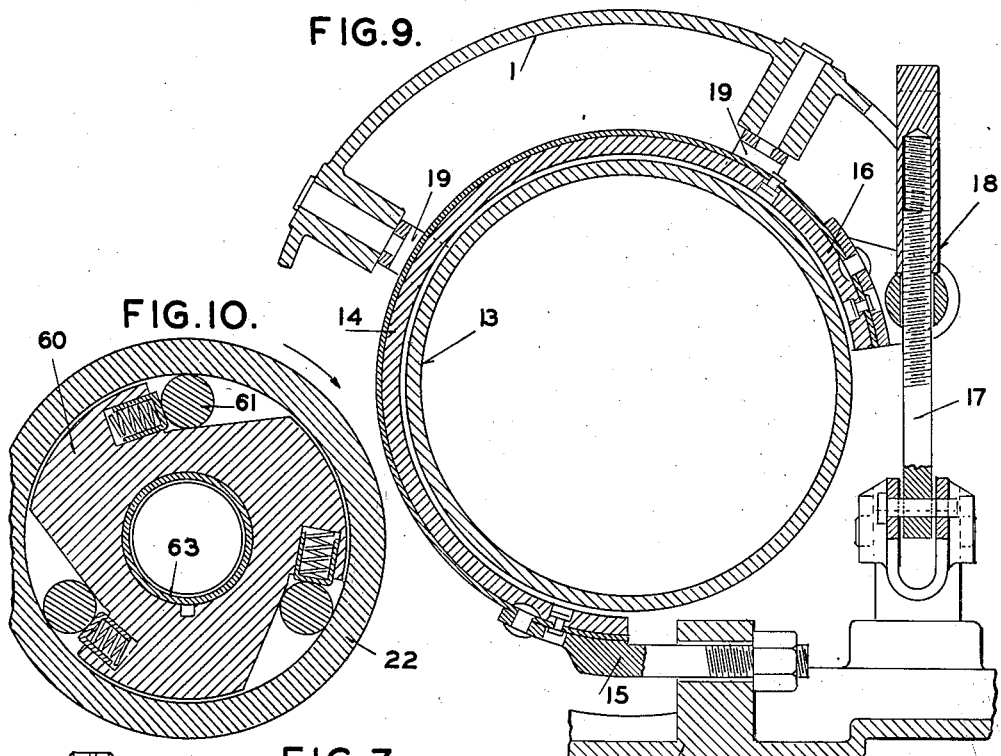
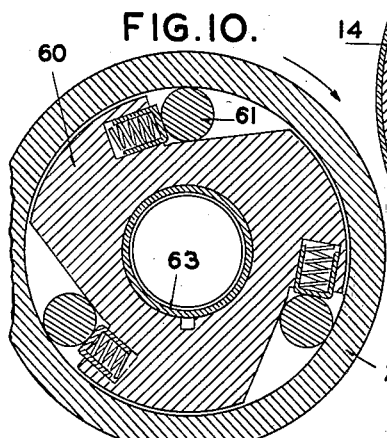
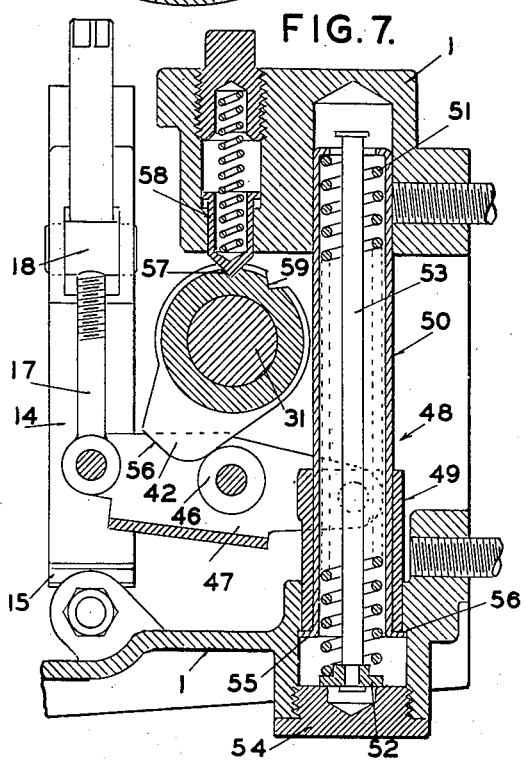
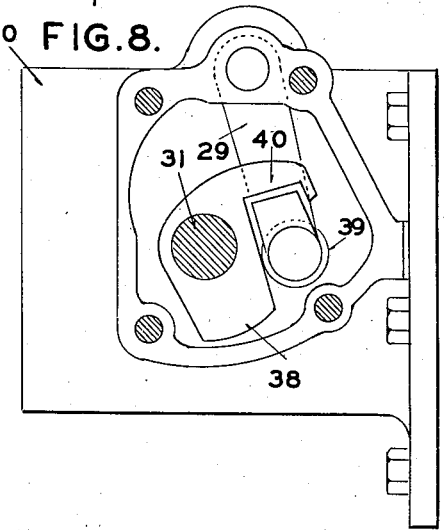
INVENTORS
WERNER F. BOLDT
GEORGE H. THOMAS
BY
ATTORNEY.

Patented Apr. 6, 1937

2,076,362

UNITED STATES PATENT OFFICE 2,076,362

POWER TRANSMISSION MECHANISM

Werner F. Boldt and George Harry Thomas, St. Louis, Mo.; said Boldt assignor to Wagner Electric Corporation, St. Louis, Mo., a corporation of Delaware, and said Thomas assignor to Piero Mariano Salerni, London, England Application October 24, 1935, Serial No. 46,515

15 Claims. (Cl. 192—12)

Our invention relates to power transmission mechanism and more particularly to a transmission mechanism embodying a Fottinger fluid coupling.

In present day vehicles, especially automobiles, power is transmitted from the engine to the wheels through a friction clutch. This clutch is, of course, subject to frictional slip and as a result it has been a constant source of trouble. A transmission mechanism has been constructed in which this friction clutch has been eliminated and a fluid coupling of the Fottinger type employed. In such transmission mechanism a brake has been employed to stop the turbine element and a synchronized jaw clutch has been employed to disconnect the change speed gear from the propeller shaft to facilitate gear shifting. This transmission system has been found to be very successful in the elimination of frictional slip and also efficient in operation as it permits rapid and easy gear changing and a smooth transfer of power from the engine to the road wheels. The system, however, is not as readily adaptable to use on present day automobiles as is desired, due to its lack of compactness and relative high cost of manufacture. Also, it requires some alterations in the shifting mechanism of the change speed gearing now being used in order to permit proper operation of the synchronized jaw clutch during reverse drive.

One of the objects of our invention is to overcome the above mentioned difficulties by the new arrangement and cooperation of elements herein described.

Another object of our invention is to produce a power transmission system of the above type which is economical to manufacture, compact in size, and one which can employ a change speed gear box of the type now used in automobiles and without alteration.

A still further and more specific object is to produce a simplified single control means for operating the clutch and the brake during gear changing.

Other objects of our invention will become apparent from the following description taken in connection with the accompanying drawings, disclosing a single embodiment thereof, in which Figure 1 is a side view of our novel power transmission mechanism; Figure 2 is a partial cross-sectional view of the structure shown in Figure 1; Figure 3 is an enlarged view of the positive clutch and synchronizer or balking ring associated therewith; Figure 4 is a developed view of the clutch teeth taken on the line 4—4 of Figure 3; Figure 5 is a cross-sectional view on the line 5—5 of Figure 3; Figure 6 is a cross-sectional view through the operating mechanism for the clutch and brake; Figure 7 is a cross-sectional view on the line 7—7 of Figure 6; Figure 8 is a cross-sectional view on the line 8—8 of Figure 6; Figure 9 is a cross-sectional view on the line 9—9 of Figure 2; and Figure 10 is a cross-sectional view on the line 10—10 of Figure 2.

Referring to the drawings in detail, and particularly Figures 1 and 2, our novel transmission broadly comprises a fluid coupling A of the Fottinger type having associated therewith a brake B, a synchronized positive clutch C, and a change speed gearing D all connected together in the sequence named. The fluid coupling A, the brake B, and the clutch C are all enclosed within a single unitary housing 1 and the change speed gearing D is enclosed with a separate housing 2 which is adapted to be attached to housing 1.

The fluid coupling which we prefer to employ in our transmission mechanism is of the well-known Fottinger type comprising an impeller element 3 and a turbine element 4, the impeller element being directly connected to the driving shaft 5 of the prime mover, for example, an internal combustion engine, the turbine element 4 being connected to a driven shaft 6 by a splined collar 7 which is journaled in the driving shaft 5 by means of an annular bearing 8. The impeller element 3 carries a series of blades 9 and the turbine element carries a series of cooperating blades 10, the blades being so spaced as to form an annular liquid circulating chamber having a plurality of passages. This chamber contains a suitable fluid which is supplied thereto through the passage-way 11 in the engine shaft 5. In order that the chamber may be efficiently sealed against leakage, a spring-biased diaphragm seal 12 is interposed between the impeller element and the collar 7 to which the turbine element is secured. This seal permits free relative rotation between the impeller and turbine elements while at the same time preventing leakage.

The operation of the fluid coupling is well known and need not be described in detail. When the impeller element is rotated the fluid in the chamber will be circulated through the passages and power will be transmitted to the turbine element. The fluid coupling is characterized by a slip between the impeller element and the turbine element when power is transmitted from the driving shaft 5 to the driven shaft 6. Regardless of this slip, however, the torque input is always equal to the torque output.

When the engine shaft is rotating, the driven shaft 6 will also be rotating and since it is desirable under certain conditions (to be referred to later) to stop the driven shaft, such shaft is provided with brake B. The brake comprises a brake drum 13 secured to the driven shaft within the outlines of the impeller 3 and has cooperating therewith a brake shoe 14 of the band type, one end 15 of which is adjustably anchored to a portion of the housing 1 and the other end 16 connected to an actuating rod 17 by means of an adjustable connection 18 (Figures 7 and 9). In order to insure that the brake band is properly positioned for cooperation with the brake drum, suitable guide members 19 are provided, these guide members being carried by a portion of the housing 1, as shown in Figures 6 and 9.

The driven shaft 6 (Figure 2) in addition to being journaled in the driving shaft 5 by means of collar 7, is also journaled in a secondary housing 20 by means of a bearing 21, this secondary housing lying within the main housing 1 and being secured to the gearing housing 2. The portion of the driven shaft which extends within the secondary housing has formed thereon a clutch member 22 provided with teeth 23 and piloted within the end of the driven shaft, and lying within the secondary housing is an intermediate shaft 24, which shaft is the driving shaft of the change speed gearing D. This intermediate shaft has splined thereon a slidable clutch member 25 having teeth 26 (Figure 3) for interengagement with the teeth on the clutch member 22. A shifting collar 27 is mounted on the slidable clutch member by means of a ball bearing 28, the inner face of the bearing being secured to the clutch member and the outer face being secured to the shifting collar. A shifting fork 29 is pivotally mounted in the secondary housing 20 for shifting the clutch member 25 into and out of cooperative relation with the clutch member 22. The shiftable member is normally biased toward the engaged position of the clutch by coil spring 30 surrounding the shaft 24.

The brake B and the positive clutch C are adapted to be operated by a single control means, this control means being so constructed that the clutch will be disengaged prior to the engagement of the brake band with the brake drum to retard the shaft 6 and the turbine element. The control means shown comprises a rotatable control shaft 31 journaled in a suitable boss 32 on the secondary housing cover 33 (Figure 6). This shaft 31 is shown as being actuated by a suction motor although if desired, other power means may be used or the shaft may be manually actuated. The suction motor 34 is connected by rod 35 to a lever 36 secured on the shaft. The suction motor is in communication with a suitable source of suction, as for example, the manifold of the engine, and is mounted on the change speed gearing housing (Figure 1) and controlled by a foot valve 37 in the connecting conduit, the valve being preferably positioned in the operator's compartment of the vehicle. The end of shaft 31 within the secondary housing has fixed thereto a cam member 38 for cooperative relation with a roller 39 carried by one arm of the shifting fork 29. The cam member carries a locking-arm 40 adapted to hook over a portion of the arm of the shifting fork to prevent accidental disengagement of the clutch members. When the locking arm is in locking position, there is a sufficient clearance between cam 38 and roller 39 and between the end of arm 40 and the portion of the shifting fork, as shown in Figure 8, to permit the locking arm to freely unlock when the cam is rotated.

The outer end of the control shaft 31 has rotatably mounted thereon a sleeve 41 carrying at one end an integral cam 42, the other being provided with lugs 43 for cooperative engagement with lugs 44 on the portion 45 of lever 36. The space between the lugs 44 is of greater width than the width of teeth 43 in order that a lost motion connection may be provided between the member 45 and the sleeve 41. The cam portion 42 of the sleeve cooperates with a roller 46 carried by the brake actuating lever 47, one end of which is pivotally connected to the brake band actuating rod 17 and the other is adapted to be pivotally connected to a pre-loaded spring device 48.

This spring device forms a yieldable fulcrum for the end of the brake actuating lever and comprises a sleeve 49 to which lever 47 is connected, the sleeve being mounted on a tube 50 containing a coil spring 51. One end of the coil spring abuts the upper end of tube 50 and the lower end of the spring engages a collar 52 carried at the end of a rod 53 extending through the coil spring. The coil spring is pre-loaded whereby the rod 53 is biased against a plug 54 in housing 1, and the lower flanged end 55 of the tube is biased against an annular shoulder 56 lying within the recess of the housing which is closed by plug 54. The lower end of the tube surrounding sleeve 49 and the upper end of the tube are guided in the housing 1 by suitable recesses as shown. The sleeve 49 to which the brake lever 47 is pivoted, is also adapted to abut the flange 55 on the lower end of the tubular member in order that the tube may be moved downward against the bias of the spring.

By means of the control structure just described, when the control shaft 31 is rotated in a counter-clockwise direction, the locking arm 40 will first release the shifting fork 29 of the clutch and then the cam 38 will operate the shifting fork to disengage the clutch. During this movement of the shaft the sleeve 41 which carries the brake actuating cam 42 will not be operated due to the lost motion between the lugs 44 on the member 45 and the lugs 43 on the cam sleeve. Additional rotation of the control shaft in the same direction (after the clutch has been disengaged) will result in rotation of the sleeve 41, and cam 42 thereby moving the brake operating lever downward. The cam 38 is so formed that this latter movement will not cause additional movement of the shifting fork. The brake is held applied without the direct application of pressure by the spring device 48, the roller 46 riding over a radial portion 56 of the cam 42 at the time.

In order to insure that the cam sleeve 41 on the control shaft is held in non-rotative position during disengagement of the clutch, the surface thereof is provided with a notch 57 for cooperation with a detent 58 carried by housing 1. A second notch 59 also cooperating with detent 58, is provided for assisting in maintaining the sleeve 41 in a position holding the brake lever in applied position.

When the control shaft is released the cam member 38 will be rotated in a clockwise direction to a position releasing the clutch shifting fork. During this movement of the control shaft and the cam member 38 the brake will be maintained applied by reason of detent 58 holding the sleeve 41 in brake applied position while the lost motion between lugs 43 and 44 is being taken up. The parts are so constructed that the brake will be retained applied until the clutch member 25 assumes a position wherein it is ready to engage the clutch member 22. Further, release of the control shaft will take up the lost motion between parts 43 and 44, rotating sleeve 41 enough to move the cam 42 from the dwell portion onto the lift portion. Since the spring device 48 is reacting against the parts carrying roller 46, its reaction against the cam 42 will throw the sleeve in the opposite direction by an amount equal to the lost motion travel. During this movement the detent 58 will be disengaged from notch 59 and engaged in notch 57.

In order to prevent the teeth of the cooperating clutch members 22 and 25 from clashing during their re-engagement in the event such clutch members are not rotating at synchronous speeds, we have also provided means to hold the slidable member of the clutch away from the other clutch member until the proper time for engagement. This means comprises a ring member 60 lying within the clutch member 22 and adapted to be driven by the clutch member in a clockwise direction only by a one-way roller clutch connection 61. Also lying within the clutch member 22 is a balking ring 62 held in tight frictional engagement with ring 60 by means on an annular collar 63 and an annular spring 64. The balking ring carries a plurality of spaced lugs 65 adapted to project into openings 66 in the slidable clutch member 25 and to at all times be rotatable with this clutch member. Each lug 65 is provided with a stepped portion forming a shoulder 67 adapted to engage a surface 68 of the clutch member only when the clutch member is disengaged from the fixed clutch member 22. A thrust bearing 69 is provided between the ring 60 and the clutch member 22 in order to take the thrust of the driven clutch member when it is biased toward engaged position by the clutch engaging spring 30.

After the slidable clutch member 25 has been moved to disengaged position and returned to a position permitting reengagement by the control mechanism already described; it will be prevented from engagement by the shoulder 67 on the lug of the balking ring engaging the surface 68 on the slidable clutch member, this position being assumed as the result of friction acting on the balking ring and the clutch member 22 being retarded or held stationary by the applied brake. When the clutch member 22 is driven through the hydraulic coupling after the brake is released and at a speed slightly greater than the speed at which the driven clutch member 25 is rotating, the ring 60 will be picked up by the one-way roller clutch and by means of the frictional contact between the ring 60 and the balking ring 62 the balking ring will move relatively to the slidable clutch member to disengage shoulder 67 from the surface 68 and allow the lugs 65 to move into the openings 66. When this condition is attained the slidable clutch member is free to be moved into engaged position with the clutch member 22 by means of spring 30. In order to additionally assist in the quiet engagement of the teeth 23 and 26 of the clutch members, the teeth are slightly beveled as shown.

The intermediate shaft 24, in addition to being journaled in the driven shaft 6, is also journaled in the end of the gearing housing by means of a bearing 70 and has formed on its end which projects into the gearing housing, a driving gear 71 for the change speed gearing. This driving gear is adapted to mesh with a gear 72 on a counter-shaft 73 which in turn constantly rotates other gears mounted on the counter-shaft as is well-known in this type of change speed gearing. Since the change speed gearing employed is of standard construction it is believed to be unnecessary to disclose and describe the entire transmission. The change speed gearing employed, however, is preferably of the synchronized type, that is, synchronizing means being provided between the engageable and disengageable members of the transmission to prevent clashing during changing of gear ratios. Figure 2 discloses in detail a portion of such synchronizing means in a standard transmission, the synchronizing means shown being between the engageable and disengageable element of the high speed ratio.

Referring to Figure 2, the gear 71 has formed thereon a clutch element 74 for cooperation with the slidable clutch element 75 mounted on the driven shaft 76 of the gearing. Slidable element 75 is splined to a second slidable element 77 splined to the driven shaft 76 of the gearing, which driven shaft drives the wheels of the vehicle by means of the usual propeller shaft 83. The clutch element 74 carries a conical friction surface 78 for cooperation with a conical friction surface 79 on the member 77. When the shifting fork 80 is moved by the gear shift lever 81 to engage the clutch element 75 with clutch element 74 to produce a direct drive between the intermediate shaft 24 and the driven shaft 76, the member 77 will be moved first by means of the detent 82 to a position establishing the frictional drive through the conical friction surfaces 78 and 79. This frictional connection of the shafts causes them to rotate in unison and as the result, additional pressure on the shifting fork will cause the shiftable clutch element 75 to be freely movable into engagement with clutch element 74 by release of the detent 82.

In operation of our novel transmission system, when the vehicle is standing still the gearing of the change speed gearing will be in neutral position, the brake B will be in release position, and the clutch C will be in engaged position. Under these conditions the engine is generally idle but a certain amount of torque will be transmitted from the engine shaft 5 to the intermediate shaft 24 by the fluid coupling. However, this transmission of torque will have no effect in moving the vehicle since the driven shaft 76 of the gearing connected to the wheels of the vehicle is completely disengaged from the intermediate shaft 24 and will merely be free to rotate. If it is now desired to transmit power from the engine shaft to the propeller shaft 83 to drive the vehicle, the valve 37 of the suction motor 34 is operated, thereby causing the suction motor to rotate the control shaft 31 in a counter-clockwise direction. The rotation of this shaft first causes the disengagement of clutch C and then the application of the brake in the manner previously described. The application of the brake retards the driven shaft 6 of the turbine element 4 of the fluid coupling, and the disengagement of the clutch frees the intermediate shaft 24 from the driven shaft 6. The gear ratio desired at starting may now be selected and engaged by the proper shifting of the gear shift lever 81, this gear ratio preferably being the low speed ratio.

With the gear ratio engaged, the suction motor 34 is permitted to release the control shaft 31 by proper actuation of the control valve 37. The clutch return spring 30 is now free to move the slidable clutch element 25 toward its engaged position but engagement of the clutch will not be permitted due to the balking ring 62 holding the slidable member out of engagement. During this movement of the slidable clutch element the brake will remain applied as a result of the lost motion between the control shaft and the brake actuating cam 42, the brake actuating cam being held in brake applied position by detent 58 engaging the notch 59 in sleeve 41. Continued release rotation of the control shaft will cause the brake actuating cam to be rotated, thereby releasing the brake. As soon as the brake is released the driven shaft 6 will be rotated by the driving shaft through the fluid coupling and as the result thereof the balking ring will be moved relatively to the slidable clutch member and to a position permitting such member to move to engaged position with the clutch member 22 on the driven shaft in the event the balking ring is not already in a position permitting free engagement of the clutch member. With the clutch connected, power may now be transmitted from the engine shaft to the wheels of the vehicle by speeding up the engine.

After a certain speed of the vehicle has been attained and it is desired to shift to a higher speed ratio, the control valve 37 is actuated and as the result thereof clutch C is again disengaged and brake B applied in the manner described. Under these conditions the driven shaft 6 will again be retarded or stopped and the intermediate shaft 24 disconnected from the driven shaft 6, thereby permitting the engaged gear of the change speed gearing to be disengaged and the new and higher speed gear to be engaged. Since the vehicle is moving at the time this shift is made, the intermediate shaft 24 will be driven from the road wheels of the vehicle. To connect the engine to the road wheels and apply power thereto the control valve 37 is released and the slidable clutch element permitted to assume an engaged position, engagement, however, being prevented by the balking ring 62. As soon as the brake is released, the engine may be speeded up, thereby driving the driven shaft 6 at an increased speed. When the driven shaft 6 attains a speed not greater than that of the intermediate shaft 24, connected to the road wheels through the change speed gearing, the clutch member 22 will pick up ring 60 through the one-way roller connection and by means of the friction engagement between ring 60 and the balking ring 62 the latter will be moved relatively to the slidable clutch member, thus moving the shoulder 67 of lug 65 out of engagement with the slidable clutch member and permitting the clutch member's engagement with clutch member 22 under the action of spring 30. The re-connection of the clutch is thus performed without any clashing of the co-operating teeth.

Other changes of gear ratio in the change speed gearing, either from a low speed to a higher speed, or vice versa, is performed in a manner similar to those described.

From the foregoing description it will be readily seen that our transmission system permits of easy and rapid shifting of gear ratios of the change speed gearing since, during shifting, the engine is disconnected from the road wheels of the vehicle by disengagement of the positive clutch C. The reconnection of the engine shaft with the road wheels after the gearing has been shifted, is performed without any clash of the teeth of the positive clutch as the balking ring prevents any engagement until the teeth of the clutch members have attained substantially synchronous speed. Disengagement of the clutch is also readily accomplished even though torque is being transmitted through the clutch since during shifting, the engine is generally idling and by having the non-driving surfaces of the cooperating teeth 23 and 26 sloped, their disengagement is readily accomplished. The driving surfaces of these teeth may also be sloped to assist in disengagement, such construction being permitted due to the fact that the clutch is locked in engaged position by the arm 40 on cam 38. By having the positive clutch C between the fluid coupling and the change speed gearing, power is always transmitted through the clutch in one direction regardless of whether the change speed gearing is in a forward or reverse ratio. Because of this, it is not necessary to provide any special interconnection between the change speed gearing and the balking ring to shift the balking ring to a position permitting engagement of the clutch when the reverse gear ratio of the gearing is operated, as must be done in power transmissions wherein the synchronized positive clutch C has been placed between the change speed gearing and the road wheels.

The entire transmission system is very compact, thus eliminating considerable weight, together with the accompanying cost of manufacture. Also, due to the close positioning of the brakes and of the positive clutch, the control structure is simplified in a manner increasing its efficiency. By having the positive synchronized clutch positioned ahead of the transmission, it is not necessary to alter the standard change speed gearing in any manner to incorporate the fluid coupling, the brake, and the clutch between the engine shaft and the change speed gearing, which position is now occupied by a friction clutch. The transmission system eliminates all possibility of any frictional slip between the engine shaft and the road wheels since all power is transmitted through elements under shear. It is also to be noted that the arrangement of the parts permits easy assembly and disassembly. When the gearing housing is separated from the main housing 1 the secondary housing 20, the clutch C, the brake drum, and the shaft 6 will all be carried with the gearing housing.

Having fully described our invention, what we claim as new and desire to secure by Letters Patent of the United States is:

1. In engine driven vehicles, mechanism for transmitting engine power to the wheels of a vehicle comprising a hydraulic power transmitter of the kinetic type having an impeller element and a turbine element, said turbine element being subject to torque at idling speed of the engine, a change speed gearing having a driving shaft, means comprising interengageable elements for connecting and disconnecting the turbine element and the driving shaft of the change speed gearing, means associated with said elements preventing their movement into engagement except under condition of substantially synchronous speeds, and means for controlling the rotative speed of the turbine element when the latter is disconnected from the driving shaft of the gearing.

2. In transmission mechanism, a driving shaft, a driven shaft, a hydraulic power transmitter of the kinetic type interposed between the shafts and comprising an impeller element connected to the driving shaft and a turbine element connected to the driven shaft, a brake for the turbine element and comprising a drum secured to the driven shaft at a point within the outline of the hydraulic power transmitter, a change speed gearing having an axially fixed driving shaft, the adjacent ends of the driving shaft of the gearing and the driven shaft being in piloted relationship, means comprising interengaging elements for connecting and disconnecting the driven shaft and the driving shaft of the gearing, and means associated with said elements for preventing their movement into engagement except under condition of substantially synchronous speeds.

3. In transmission mechanism, a driving shaft, a driven shaft, a hydraulic power transmitter of the kinetic type interposed between the shafts and comprising an impeller element connected to the driving shaft and a turbine element connected to the driven shaft, bearing means for supporting the inner end of the driven shaft from the driving shaft, a change speed gearing having a driving shaft in alignment with the driven shaft, a clutch element carried by the driven shaft, a slidable clutch element mounted on the driving shaft of the gearing for cooperation with the driven shaft clutch element, a rigid support having a bearing adjacent the clutch element on the driven shaft for supporting the outer end of said shaft, and a brake for the turbine element comprising a drum secured to the driven shaft between the turbine element and the last named bearing.

4. In transmission mechanism, a driving shaft, a driven shaft, a hydraulic power transmitter of the kinetic type interposed between the shafts and comprising an impeller element connected to the driving shaft and a turbine element connected to the driven shaft, a change speed gearing having a driving shaft in alignment with the driven shaft, the end of said driven shaft adjacent the driving shaft of the gearing being provided with a bell-shaped clutch element surrounding the gearing shaft, a slidable clutch element on the gearing shaft for cooperating with the first named clutch element, and means lying within the bell-shaped clutch element and cooperating with the clutch elements for preventing their movement into engagement except under condition of substantially synchronous speeds.

5. In transmission mechanism, a driving shaft, a driven shaft, a hydraulic power transmitter of the kinetic type interposed between the shafts and comprising an impeller element connected to the driving shaft and a turbine element connected to the driven shaft, a gear housing, a change speed gearing in said housing provided with an extended driving shaft in alignment with the turbine driven shaft, a clutch for connecting and disconnecting the driven shaft and the gearing driving shaft, and a bearing for the driven shaft adjacent the clutch, said bearing being supported from the gear housing.

6. In transmission mechanism, a driving shaft, a driven shaft, a hydraulic power transmitter of the kinetic type interposed between the shafts and comprising an impeller element connected to the driving shaft and a turbine element connected to the driven shaft, a brake for the turbine element and comprising a drum secured to the driven shaft, the end of the driven shaft having an integral bell-shaped portion provided with integral clutch teeth, a change speed gearing having a driving shaft extending within the bell-shaped portion and piloted in the end of the driven shaft, a slidable clutch element on the driving shaft of the gearing for cooperation with the first named clutch teeth for connecting and disconnecting the gearing from the turbine element, and a fixed support having a bearing for the driven shaft, said bearing being positioned between the brake drum and the bell-shaped portion.

7. A power transmission mechanism having in combination a driving shaft, a driven shaft, a hydraulic power transmitter of the kinetic type interposed between said shafts and comprising an impeller connected to the engine shaft and a turbine element connected to the driven shaft, a brake associated with the driven shaft and adapted to retard the turbine, an intermediate shaft, a positive clutch mechanism for connecting and disconnecting the driven shaft and intermediate shaft and comprising relatively movable interengaging elements, a synchronizer ring associated with and positioned within the outlines of the clutch elements for preventing their engagement until the speed of the driving element of the clutch mechanism is substantially the same as the driven element of the clutch, a propeller shaft, and change speed gearing interposed between the intermediate shaft and the propeller shaft.

8. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted to retard the turbine, an intermediate shaft, a positive clutch mechanism for connecting and disconnecting the driven shaft and intermediate shaft and comprising relatively movable interengaging elements, means associated with and positioned within the outlines of the elements of the clutch for preventing their engagement until the interengaging portions thereof have attained substantially synchronous speed, a propeller shaft, change speed gearing interposed between the intermediate shaft and the propeller shaft, and means operatively connected to the clutch mechanism and the brake whereby the elements of the clutch may be disengaged and the brake applied to thereby facilitate gear changing.

9. A transmission mechanism for a power driven vehicle having in combination a driving shaft, a driven shaft, a hydraulic power transmitter interposed between said shafts and comprising an impeller connected to the engine shaft and a turbine element connected to the driven shaft, a brake associated with the driven shaft and adapted to retard the turbine, an intermediate shaft, a positive clutch mechanism for connecting and disconnecting the driven shaft and intermediate shaft and comprising relatively movable interengaging elements, means associated with the elements of the clutch for preventing their engagement until the interengaging portions thereof have attained substantially synchronous speed, a propeller shaft continuously connected to the vehicle wheels, change speed gearing of the type embodying synchronizing means between the cooperating elements establishing a gear ratio and interposed between the intermediate shaft and the propeller shaft, and means operatively connected to the clutch mechanism and the brake whereby the elements of the clutch may be disengaged and the brake applied to thereby facilitate gear changing, said last named means embodying means permitting the clutch to be disengaged prior to the application of the brake.

10. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted to retard the turbine, an intermediate shaft, a positive clutch mechanism for connecting and disconnecting the driven shaft and intermediate shaft and comprising relatively movable interengaging elements, means associated with the elements of the clutch for preventing their engagement until the interengaging portions thereof have attained substantially synchronous speed, a propeller shaft, change speed gearing interposed between the intermediate shaft and the propeller shaft, and control means for first disengaging the clutch elements and then applying the brake, said control means embodying means whereby the clutch elements will be freed to permit engagement prior to release of the brake when the control means is released.

11. A power transmission mechanism having in combination a driving shaft, a driven shaft, a hydraulic power transmitter interposed between said shafts and comprising an impeller connected to the engine shaft and a turbine element connected to the driven shaft, a brake drum secured to the driven shaft, a brake shoe adapted to engage the drum to retard the impeller element, a positive clutch element carried by and rotatable with the driven shaft and lying within the circumference of the drum, a third shaft, a positive slidable clutch element carried by the third shaft and adapted to cooperate with the other clutch element to permit connection and disconnection of the driven shaft and third shaft, means associated with the clutch elements for preventing their engagement until they have attained substantially synchronous speeds, and common control means for the slidable clutch element and the brakes, said control means when released allowing the slidable clutch element to assume a position permitting engagement with the other clutch element prior to release of the brake whereby upon release of the brake the clutch elements may freely engage when the driven shaft is rotated by the transmitter at substantially the same speed as the third shaft.

12. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted to retard the turbine, a propeller shaft, means comprising a positive clutch mechanism for connecting and disconnecting the driven shaft from the propeller shaft and comprising relatively movable interengaging elements, means associated with the elements of the clutch for preventing their engagement until the interengaging portions thereof have attained substantially synchronous speed, and control means for first disengaging the clutch elements and then applying the brake, said control means embodying means whereby the clutch elements will be freed to permit their engagement prior to release of the brake when the control means is released.

13. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted when applied to retard the turbine, a positive clutch element carried by and rotatable with the driven shaft, a third shaft, a positive clutch element carried by and rotatable with the third shaft and adapted to cooperate with the other clutch element to permit connection and disconnection of the driven shaft and third shaft, means associated with the clutch elements for preventing their engagement until they have attained substantially synchronous speeds, a rotatable control shaft, a connection between the shaft and one of the clutch elements for disengaging the clutch and a lost motion connection between the shaft and the brake whereby the brake will not be applied until the clutch elements are disconnected.

14. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted when applied to retard the turbine, a positive clutch element carried by and rotatable with the driven shaft, a third shaft, a positive clutch element carried by and rotatable with the third shaft and adapted to cooperate with the other clutch element to permit connection and disconnection of the driven shaft and third shaft, means associated with the clutch elements for preventing their engagement until they have attained substantially synchronous speeds, shifting means for one of the clutch elements, control means comprising a cam for actuating the shifting means, and a connection between the control means and the brake, said connection including a lost motion device whereby the brake will not be applied until the clutch elements have been disengaged.

15. A power transmission mechanism having in combination a driving shaft, a driven shaft, a hydraulic power transmitter interposed between said shafts and comprising an impeller connected to the engine shaft and a turbine element connected to the driven shaft, a brake associated with the driven shaft and adapted when applied to retard the turbine, a positive clutch element carried by and rotatable with the driven shaft, a third shaft, a positive clutch element carried by and rotatable with the third shaft and adapted to cooperate with the other clutch element to permit connection and disconnection of the driven shaft and third shaft, means associated with the clutch elements for preventing their engagement until they have attained substantially synchronous speeds, shifting means for one of the clutch elements, control means comprising a cam for actuating the shifting means, a connection between the control means and the brake, said connection comprising a pre-loaded spring device for maintaining the brake applied, a cam for operating the spring device, and a lost motion device between the last named cam and the control means.

GEO. H. THOMAS.
WERNER F. BOLDT.